US010619712B2

United States Patent
Kwon et al.

(10) Patent No.: US 10,619,712 B2
(45) Date of Patent: *Apr. 14, 2020

(54) TENSIONER MOUNTING STRUCTURE FOR VEHICLE

(71) Applicants: Hyundai Motor Company, Seoul (KR); Kia Motors Corporation, Seoul (KR)

(72) Inventors: Heedo Kwon, Gunpo-Si (KR); Kye Oong Song, Yongin-si (KR); Tae Hoon Roh, Seoul (KR); Jong Won Lee, Hwaseong-si (KR); Jaekyun Lee, Hwaseong-si (KR); In Jae Seo, Seoul (KR); Hyun Jeong Baek, Busan (KR); Jae Kyu Lee, Hwaseong-si (KR); Woong Na, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

This patent is subject to a terminal disclaimer.

(21) Appl. No.: 15/821,965

(22) Filed: Nov. 24, 2017

(65) Prior Publication Data
US 2019/0072159 A1 Mar. 7, 2019

(30) Foreign Application Priority Data
Sep. 7, 2017 (KR) .................. 10-2017-0114572

(51) Int. Cl.
*F16H 7/12* (2006.01)
*F02B 67/06* (2006.01)
(Continued)

(52) U.S. Cl.
CPC .......... *F16H 7/1281* (2013.01); *F02B 67/06* (2013.01); *F16H 55/36* (2013.01); *F01P 5/12* (2013.01);
(Continued)

(58) Field of Classification Search
CPC .......... F16H 7/1281; F16H 2007/0806; F16H 2007/0874; F16H 2007/081; F02B 67/06
(Continued)

(56) References Cited

U.S. PATENT DOCUMENTS 4,758,208 A * 7/1988 Bartos ................... F16H 7/1281
474/135
4,959,042 A * 9/1990 Tanaka ................... F02B 67/06
474/134

(Continued)

FOREIGN PATENT DOCUMENTS

JP 2980750 B2 11/1999
JP 2011-220408 A 11/2011
JP 4994285 B2 8/2012

*Primary Examiner* — Henry Y Liu
(74) *Attorney, Agent, or Firm* — Morgan, Lewis & Bockius LLP

(57) ABSTRACT

A tensioner mounting structure for the vehicle mounted for adjusting a tension of a first belt in an engine including a water pump and a mild hybrid starter and generator that are connected to a damper pulley mounted on a crankshaft provided in a cylinder block through the first belt, and an air conditioner compressor connected to the damper pulley through a second belt, may include a first tensioner mounted on the mild hybrid starter and generator between the water pump and the mild hybrid starter and generator; and a second tensioner mounted on a chain cover mounted on the engine between the damper pulley and the mild hybrid starter and generator.

7 Claims, 3 Drawing Sheets

(51) Int. Cl.
  *F16H 55/36* (2006.01)
  *F16H 7/08* (2006.01)
  *F02N 11/04* (2006.01)
  *F02B 63/04* (2006.01)
  *F01P 5/12* (2006.01)

(52) U.S. Cl.
  CPC ............... *F02B 63/04* (2013.01); *F02N 11/04* (2013.01); *F16H 2007/0842* (2013.01); *F16H 2007/0865* (2013.01); *F16H 2007/0874* (2013.01); *F16H 2007/0893* (2013.01); *F16H 2007/0897* (2013.01); *F16H 2055/366* (2013.01)

(58) Field of Classification Search
  USPC .......................................................... 474/134
  See application file for complete search history.

(56) References Cited

U.S. PATENT DOCUMENTS

| | | | | |
|---|---|---|---|---|
| 4,997,409 A * | 3/1991 | Sonoda | .................... | F02B 37/02 474/101 |
| 5,131,889 A * | 7/1992 | Meckstroth | ............. | F02B 67/06 474/117 |
| 6,648,783 B1 * | 11/2003 | Bogner | ................. | F16H 7/1281 474/134 |
| 7,494,434 B2 * | 2/2009 | McVicar | ............... | F16H 7/1281 474/101 |
| 8,057,334 B2 * | 11/2011 | Kotzur | .................. | F16H 7/1281 474/133 |
| 8,439,780 B2 * | 5/2013 | Ruffini | .................. | F16H 7/1281 474/112 |
| 8,568,259 B2 * | 10/2013 | Robbins | ................. | F16H 7/1281 474/135 |
| 8,602,930 B2 * | 12/2013 | Deneszczuk | .......... | F16H 7/1281 474/112 |
| 10,018,254 B2 * | 7/2018 | Wright | .................... | F02B 63/04 |
| 2006/0287146 A1 * | 12/2006 | McVicar | ............... | F16H 7/1281 474/109 |
| 2007/0037648 A1 * | 2/2007 | Di Giacomo | ......... | F16H 7/1281 474/134 |
| 2010/0331127 A1 * | 12/2010 | Dec | ....................... | F16H 7/1218 474/135 |
| 2011/0065539 A1 * | 3/2011 | Robbins | ................ | F16H 7/1281 474/135 |

* cited by examiner

TENSIONER MOUNTING STRUCTURE FOR VEHICLE

CROSS-REFERENCE TO RELATED APPLICATION

The present application claims priority to Korean Patent Application No. 10-2017-0114572 filed on Sep. 7, 2017, the entire contents of which is incorporated herein for all purposes by this reference.

BACKGROUND OF THE INVENTION

Field of the Invention

The present invention relates to a tensioner mounting structure for a vehicle. More particularly, the present invention relates to a tensioner mounting structure for a vehicle mounted to optimized a layout of accessory elements on an engine in hybrid vehicle to which a mild hybrid starter and generator.

Description of Related Art

In general, accessory elements such as a camshaft, an alternator, a power steering pump, an air conditioner compressor, etc. are mounted on an engine and are connected to a crankshaft of the engine by a belt. Accordingly, a power of the crankshaft is transmitted to the accessory elements by a frictional force of the belt.

Recently, in a hybrid vehicle, a mild hybrid starter and generator is applied for a driving in a starting, or a low engine speed, or an operation stopping section of the engine.

Accordingly, the mild hybrid starter and generator is mounted on the engine of the hybrid vehicle along with the accessory elements and is connected to the crankshaft and the accessory elements through the belt.

Here, since the mild hybrid starter and generator is heavily loaded, there is a high possibility that a slip of the belt occurs, and it is necessary to adjust a tension of the belt according to an operation condition.

If the tension of the belt is too strong, the frictional force of the belt increases such that the friction loss increases, and if the tension of the belt is too small, the slip of the belt occurs such that a power delivery efficiency drops.

As a result, a tensioner for a tension adjustment of the belt is mounted on the engine to be in contact with the belt.

However, in the above-mentioned conventional tensioner mounting structure, since the tensioner must be mounted on the engine while avoiding an interference with each of the constituent elements in an operation range of the tensioner, an arrangement layout of each of the accessory elements is constrained, accordingly, an entire size of the engine increases such that a compact configuration is difficult.

Also, in the conventional tensioner mounting structure, it is difficult to sufficiently obtain a length of a tensioner arm to operate the tensioner while avoiding the interference with each accessory element, therefore, this also implies a problem that a durability of the tensioner and a belt conformability are deteriorated.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a tensioner mounting structure for a vehicle mounted to optimize a layout of the accessory elements mounted on the engine in the hybrid vehicle to which the mild hybrid starter and generator is applied.

A tensioner mounting structure for a vehicle mounted for adjusting a tension of a first belt in an engine including a water pump and a mild hybrid starter and generator that are connected to a damper pulley mounted on a crankshaft provided in a cylinder block through the first belt, and an air conditioner compressor connected to the damper pulley through a second belt, may include a first tensioner mounted on the mild hybrid starter and generator between the water pump and the mild hybrid starter and generator; and a second tensioner mounted on a chain cover mounted on the engine between the damper pulley and the mild hybrid starter and generator.

The first tensioner may include a first tensioner arm having one end portion hinged to the mild hybrid starter and generator; and a first pulley mounted to the other end portion of the first tensioner arm to be rotatable and selectively in contact with the first belt upward with respect to a height direction of the engine.

A length D from a rotation center C of the first tensioner arm mounted on the mild hybrid starter and generator to a mounting point P of the first pulley is about 80 mm.

The second tensioner may include a second tensioner arm having one end portion mount on the chain cover to be rotatable corresponding to the damper pulley under the engine; a second pulley mounted to the other end portion of the second tensioner arm to be rotatable and selectively in contact with the first belt downward with respect to the height direction of the engine; and a hydraulic system having one end portion hinged to one side of the lower portion of the second tensioner arm and the other end portion hinged to the chain cover between the water pump and the mild hybrid starter and generator and selectively operating the second tensioner arm.

The second tensioner arm and the hydraulic system may be disposed in parallel with a "11" character shape.

The water pump may be mounted on the engine at one side of the upper portion of the damper pulley.

The mild hybrid starter and generator may be separated from the water pump with respect to a width direction of the engine and may be mounted on the chain cover on the engine.

The air conditioner compressor may be mounted under the engine at a position separated from the damper pulley in an opposite direction of the mild hybrid starter and generator with respect to a width direction of the engine.

As above-described, according to the tensioner mounting structure for the vehicle according to an exemplary embodiment of the present invention, in the hybrid vehicle to which the mild hybrid starter and generator is applied, as the layout of the accessory elements mounted on the engine is optimized, the entire size of the engine on which the accessory elements are mounted may be reduced, and the compact configuration of the accessory elements may be planned.

Also, as the length of the first tensioner arm may be sufficiently secured, the durability of the first tensioner and the belt conformability may be improved.

Also, as the second tensioner arm and the hydraulic system are disposed in the "11" character structure (the parallel structure) in the second tensioner, it is advantage to secure the mounting space and the operation space of the second tensioner, and the interference with other parts including the driveshaft may be avoided beforehand.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
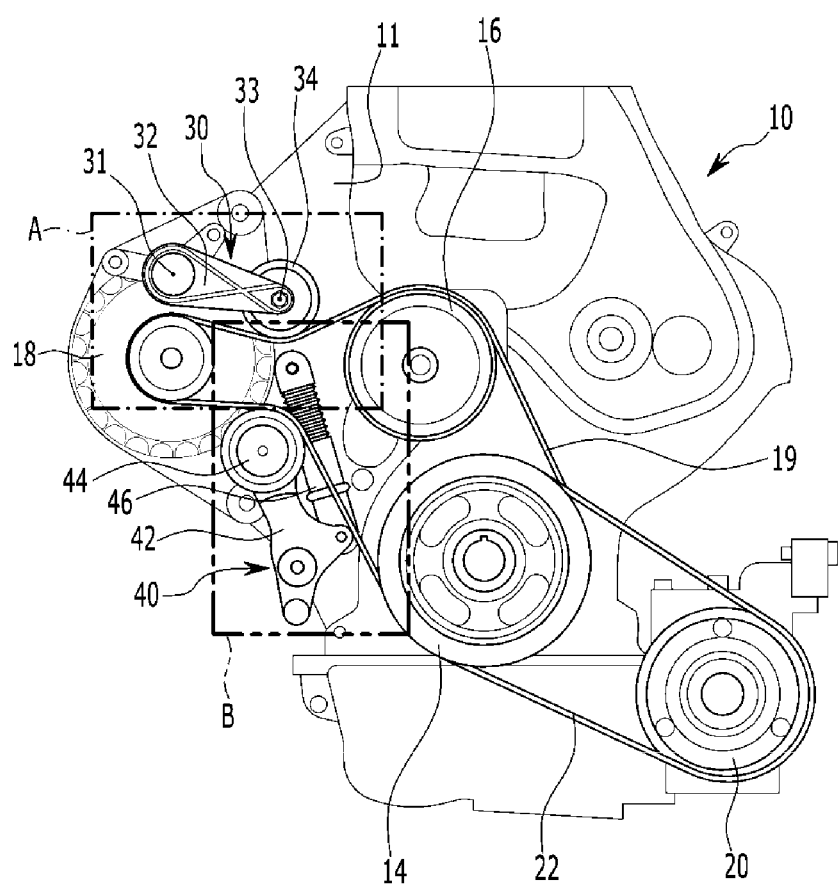
FIG. 1 is a schematic diagram of a tensioner mounting structure for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described more specifically with reference to the accompanying drawings.

The embodiment described in the present embodiment and the configuration shown in the drawings are merely an exemplary embodiment of the present invention and do not represent all of the technical spirit of the present invention. Thus, it should be understood that there may be various equivalents and modified examples that can replace the exemplary embodiments described in the present embodiment and the configuration shown in the drawings at the time of filling the present application.

To clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a device of a comprehensive configuration having at least one function or operation.

Figure 2:
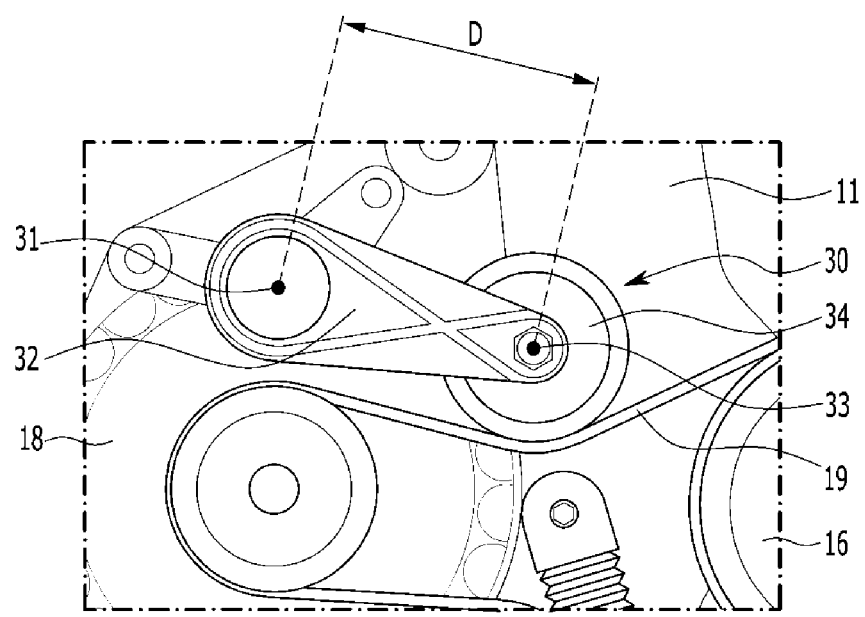
FIG. 2 is an enlarged view of a portion A of FIG. 1.
Figure 3:
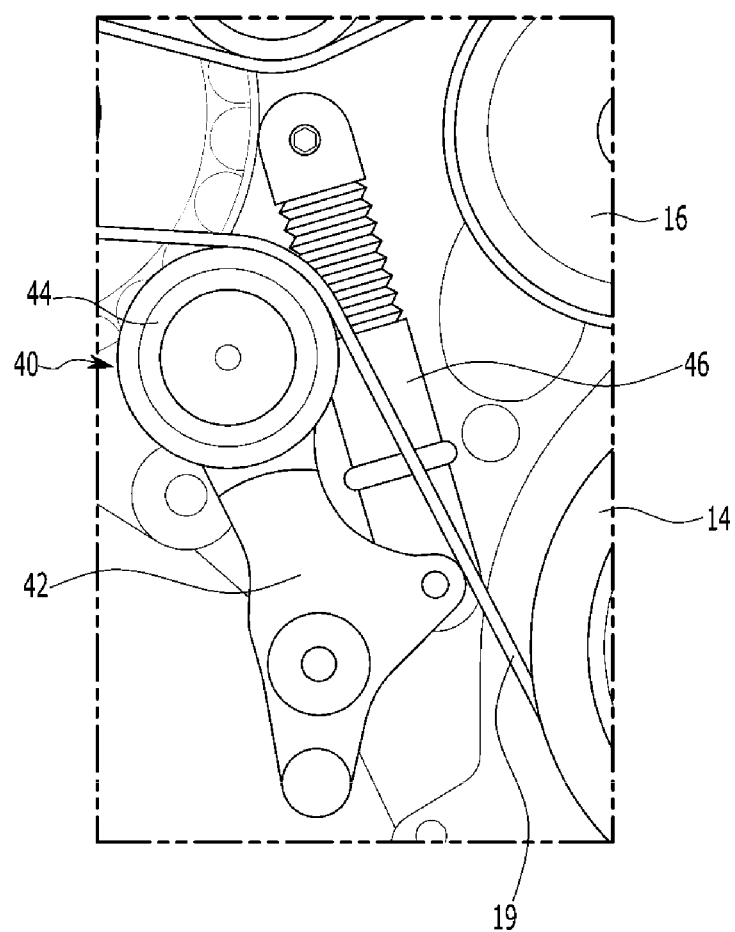
FIG. 3 is an enlarged view of a portion B of FIG. 1.

FIG. 1 is a schematic diagram of a tensioner mounting structure for a vehicle according to an exemplary embodiment of the present invention, FIG. 2 is an enlarged view of a portion A of FIG. 1, and FIG. 3 is an enlarged view of a portion B of FIG. 1.

Referring to FIG. 1, an engine 10 to which a tensioner mounting structure for a vehicle is applied according to an exemplary embodiment of the present invention includes a damper pulley 14 mounted on a crankshaft 12 provided on a cylinder block, a water pump 16 connected through a first belt 19, and a mild hybrid starter and generator 18.

Here, the water pump 16 is mounted on the engine 10 at one side of the upper portion of the damper pulley 14.

The mild hybrid starter and generator 18 is separated from the water pump 16 with respect to a width direction of the engine 10 and may be mounted on a chain cover 11 of the engine 10.

That is, the mild hybrid starter and generator 18 may be disposed at one side of the upper portion of the engine 10 with respect to the damper pulley 14.

Here, the mild hybrid starter and generator 18 is mounted on the chain cover 11 at a position separated from the water pump 16 to a right side in a width direction of the vehicle.

Accordingly, the first belt 19 may mutually connect the damper pulley 14, the mild hybrid starter and generator 18, and the water pump 16 to transmit a power of the crankshaft 12, or a power of the mild hybrid starter and generator 18 to the water pump 16.

Also, the engine 10 may further include an air conditioner compressor 20 connected to the damper pulley 14 through a second belt 22.

Here, the air conditioner compressor 20 may be mounted under the engine 10 at a position separated from the damper pulley 14 in the direction opposite to the mild hybrid starter and generator 18 with respect to the width direction of the engine 10.

Accordingly, the second belt 22 may connect the damper pulley 14 and the air conditioner compressor 20 to transmit the power of the crankshaft 12, or the power of the mild hybrid starter and generator 18 to the air conditioner compressor 20 apart from the first belt 19.

The above-configured engine 10 may respectively transmit the power of the crankshaft 12 or the power of the mild hybrid starter and generator 18 according to a driving condition of the vehicle to the water pump 16 and the air conditioner compressor 18 through the first and second belts 19 and 22.

On the other hand, FIG. 1 is a front view showing the front of the engine 10, the damper pulley 14 is disposed on the front of the engine 10, the mild hybrid starter and generator 18 is positioned at the right of the engine 10 (a left side with respect to FIG. 1), and the air conditioner compressor 20 is positioned at the left of the engine 10 (the right side with respect to FIG. 1).

Here, the tensioner mounting structure for the vehicle according to an exemplary embodiment of the present invention is applied to mount the first and second tensioners 30 and 40 at the optimized position for adjusting a tension of the first belt 19 according to the driving condition of the vehicle in the above-configured engine 10.

First, as shown in FIG. 2, the first tensioner 30 is mounted on the mild hybrid starter and generator 18 between the water pump 16 and the mild hybrid starter and generator 18.

Here, the first tensioner 30 includes a first tensioner arm 32 and a first pulley 34.

One end portion of the first tensioner arm 32 is hinged to the mild hybrid starter and generator 18.

Also, the first pulley 34 is mounted on the other end portion of the first tensioner arm 32 to be rotatable and selectively is in contact with the first belt 19 above with respect to a height direction of the engine 10.

The above-configured first tensioner 30 may be a mechanical tensioner.

Here, for the first tensioner arm 32, a length D from a rotation center 31 mounted on the mild hybrid starter and generator 18 to a mounting point 33 of the first pulley 34 may be about 80 mm.

Accordingly, as the first tensioner arm 32 secures the length D of the about 80 mm, the first tensioner 30 may improve the durability and the belt conformability.

That is, in the tensioner mounting structure for the vehicle according to an exemplary embodiment of the present invention, as the first tensioner 30 is mounted on the mild hybrid starter and generator 18 to secure the length D of the first tensioner arm 32 while avoiding the interference with other parts within an operation radius, the durability and the performance dissatisfaction due to the lack of length of the tensioner arm compared with the conventional may be solved.

In the exemplary embodiment of the present invention, as shown in FIG. 3, the second tensioner 40 may be mounted on the chain cover 11 which is mounted on the engine 10 between the damper pulley 14 and the mild hybrid starter and generator 18.

Here, the second tensioner 40 includes a second tensioner arm 42, a second pulley 44, and a hydraulic system 46.

First, one end portion of the second tensioner arm 42 is mounted corresponding to the damper pulley 14 on the chain cover 11 to be rotatable under the engine 10.

The second pulley 44 is mounted on the other end portion of the second tensioner arm 42 to be rotatable. The second pulley 44 may be selectively in contact with the first belt 19 downward with respect to the height direction of the engine 10.

Also, the hydraulic system 46 includes one end portion which is hinged at one side of the lower portion of the second tensioner arm 44 and the other which is hinged to the chain cover 11 between the water pump 16 and the mild hybrid starter and generator 18. The hydraulic system 46 selectively operates the second tensioner arm 44.

The above-configured second tensioner 40 may be a hydraulic tensioner.

Here, the second tensioner arm 44 and the hydraulic system 46 may be disposed in parallel with an "11" character shape.

That is, the second tensioner 40 may be disposed in parallel and hinged to a driveshaft connected to a wheel under the engine 10 to secure the operation range while avoiding the interference.

Accordingly, when the hydraulic system 44 is operated, the second tensioner 40 moves outside the engine 10 toward the mild hybrid starter and generator 18 with respect to one end portion where the second tensioner arm 42 is mounted on the chain cover 11 or move to the center of the engine 10 toward the damper pulley 14.

Thus, as the second pulley 44 smoothly moves according to the driving condition of the engine 10 to be in contact with the first belt 19, the second pulley 44 may effectively control the tension of the first belt 19 along with the first tensioner 30.

Accordingly, if the above-described tensioner mounting structure for the vehicle according to an exemplary embodiment of the present invention is applied, as the accessory elements including the water pump 16, the mild hybrid starter and generator 18, and the air conditioner compressor 20 that are mounted on the engine 10 are mounted to optimize the layout thereof in the hybrid vehicle to which the mild hybrid starter and generator 18 is applied, the entire size of the engine 10 to which the accessory elements are mounted is reduced and the compact configuration of the accessory elements may be planned.

Also, as the length D of the first tensioner arm 32 may be sufficiently secured, the durability of the first tensioner 30 and the belt conformability may be improved.

Also, as the second tensioner arm 42 and the hydraulic system 46 are disposed in the "11" character structure (the parallel structure) in the second tensioner 40, it is advantage to secure the mounting space and the operation space of the second tensioner 40, and the interference with other parts including the driveshaft may be avoided beforehand.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A tensioner mounting structure for a vehicle mounted for adjusting a tension of a first belt in an engine including a water pump and a mild hybrid starter and generator that are connected to a damper pulley mounted on a crankshaft provided in a cylinder block through the first belt, and an air conditioner compressor connected to the damper pulley through a second belt, the tensioner mounting structure comprising:

a first tensioner mounted on the mild hybrid starter and generator between the water pump and the mild hybrid starter and generator; and a second tensioner mounted on a chain cover mounted on the engine between the damper pulley and the mild hybrid starter and generator, wherein the second tensioner includes:

a second tensioner arm having a first end portion mounted on the chain cover to be rotatable corresponding to the damper pulley under the engine;

a second pulley mounted to a second end portion of the second tensioner arm to be rotatable and selectively in contact with the first belt downward with respect to a height direction of the engine; and a hydraulic system having a first end portion hinged to a side of the lower portion of the second tensioner arm and a second end portion hinged to the chain cover between the water pump and the mild hybrid starter and generator and selectively operating the second tensioner arm, wherein in a position spaced downward from the first tensioner, the second tensioner arm and the hydraulic system are disposed in parallel to each other, and wherein the second end portion of the hydraulic system is positioned higher than the first end portion of the hydraulic system.

2. The tensioner mounting structure for the vehicle of claim 1, wherein the first tensioner includes:

a first tensioner arm having a first end portion hinged to the mild hybrid starter and generator; and a first pulley mounted to a second end portion of the first tensioner arm to be rotatable and selectively in contact with the first belt upward with respect to a height direction of the engine.

3. The tensioner mounting structure for the vehicle of claim 2, wherein a length from a rotation center of the first tensioner arm mounted on the mild hybrid starter and generator to a mounting point of the first pulley is approximately 80 mm.

4. The tensioner mounting structure for the vehicle of claim 1, wherein the second tensioner arm and the hydraulic system are disposed in parallel with a "11" character shape.

5. The tensioner mounting structure for the vehicle of claim 1, wherein the water pump is mounted on the engine at a side of an upper portion of the damper pulley.

6. The tensioner mounting structure for the vehicle of claim 1, wherein the mild hybrid starter and generator is separated from the water pump with respect to a width direction of the engine and is mounted on the chain cover on the engine.

7. The tensioner mounting structure for the vehicle of claim 1, wherein the air conditioner compressor is mounted under the engine at a position separated from the damper pulley in an opposite direction of the mild hybrid starter and generator with respect to a width direction of the engine.

* * * * *